United States Patent Office 3,016,359
Patented Jan. 9, 1962

3,016,359
COMPOSITION COMPRISING POLYVINYL CHLORIDE PLASTICIZED WITH ESTERS OF HEPTADECANEDICARBOXYLIC ACID
Donald H. Wheeler, Minneapolis, and Edgar R. Rogier, Hopkins, Minn., assignors to General Mills, Inc., a corporation of Delaware
No Drawing. Filed Jan. 23, 1959, Ser. No. 788,504
2 Claims. (Cl. 260—31.8)

This invention relates to certain esters of long chain, aliphatic, dicarboxylic acids, particularly esters of heptadecanedicarboxylic acid, and their use as plasticizers for polyvinyl resins.

It is an object of this invention to provide novel plasticized polyvinyl chloride resin compositions.

Another object of this invention is to provide such resins in which the plasticizer is an ester of heptadecanedicarboxylic acid.

Other objects and advantages will be apparent from the following disclosure.

It has been found that the esters of dicarboxylic acids prepared by the so-called "oxo" process possess properties which make the esters excellent plasticizers for polyvinyl chloride resins. Basically, the esters of this invention are of the following general structural formula,

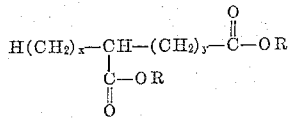

where $x$ is from 1 to 15, $y$ is from 1 to 15, R is selected from the group consisting of benzyl, tetrahydrofurfuryl and the lower alkyl radicals, and the sum of $x$ and $y$ is 16.

These compounds may be prepared by esterifying acids of the general formula

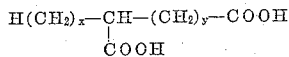

with various alcohols.

The dicarboxylic acid is in turn prepared by the addition of carbon monoxide and water to an unsaturated acid, preferably oleic acid. Preparation is shown in Reppe and Kroper, Ann. 582, 63–65 (1953) and the reaction involved is illustrated graphically below:

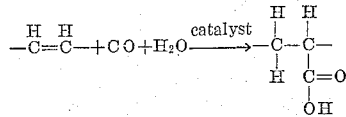

where

represents the ethylene unsaturation of the fatty acid molecule.

An alternative method is to react the carbon monoxide and unsaturated fatty acid in the presence of hydrogen to get the aldehyde or alcohol or mixtures thereof which are then oxidized to the acid as shown below:

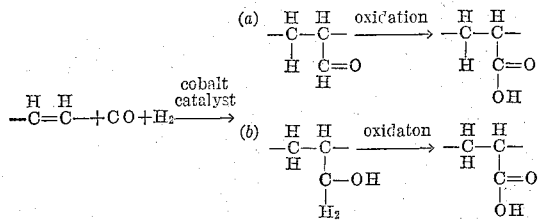

The final acid product is a mixture of isomers having one more carbon atom than the starting material. Starting with a $C_{18}$ unsaturated fatty acid such as oleic acid, the final product will be a mixture of isomers of $C_{19}$ dicarboxylic acids or heptadecanedicarboxylic acids. The product might also be regarded as a stearic acid substituted with a carboxyl group along the fatty chain.

The preferred acid employed in this invention is the $C_{19}$ dicarboxylic acids prepared from the oxonation of oleic acid. However, other $C_{18}$ unsaturated fatty acids such as linoleic, linolenic, ricinoleic and elaidic or mixtures thereof may be employed.

For the esterification of the acid a variety of the alcohols may be employed. Illustrative of these alcohols are benzyl alcohol, tetrahydrofurfuryl alcohol, and the lower alkyl alcohols in which the alkyl group has from 1 to 4 carbon atoms.

The preparation of the esters is performed in the conventional manner, for example, by heating the alcohol and acid with a small amount of concentrated sulfuric acid and distilling off of the water.

The incorporation of the esters into a polyvinyl chloride or a polyvinyl chloride containing mixed polymer may be carried out according to the conventional methods, for example, by intermittently mixing, if necessary at elevated temperature and/or under the addition of solvents or swelling agents. Rolling and kneading, preferably at elevated temperature are also suitable ways for homogenizing the mixtures. Generally speaking, from 5 to 60% of the ester with reference to the total weight of the plastic may be incorporated. Other substances, such as conventional plasticizers, stabilizing agents, dyestuffs or fillers may also be added in the formation of the compositions.

Further details of the invention may be illustrated further by reference to the following examples in which all "parts" are expressed by weight and all "percentages" are expressed as percent by weight unless specified otherwise.

Example I

The dibutyl ester of heptadecanedicarboxylic acid was prepared by heating a mixture of 50 grams of crude $C_{19}$ oxo acids, 200 ml. of n-butanol, 100 ml. of thiophene-free benzene and 3 ml. of concentrated sulfuric acid under reflux for 17 hours during which time 11.5 ml. of water collected in the water separator. The benzene solution was washed with water, sodium carbonate, and twice more with water. The wet solution was dried and the solvent removed. The product was not distilled and had an acid number of 2.1 and a saponification number of 177.0.

Example II

The dibenzyl ester of heptadecanedicarboxylic acid was prepared by esterifying 50 grams of crude oxo diacid (Acid No. 307) with 100 ml. of benzyl alcohol, benzene and sulfuric acid as described in Example I. After breaking the emulsion formed during washing, the product was dried but not distilled. The product had an acid number of 3.8 and a saponification number of 110.0.

Example III

Three different preparations of tetrahydrofurfuryl esters were made using various quality dibasic acid fractions. The procedure was the same as that previously described in Example I. The products were not distilled.

| Starting Material | Tetrahydrofurfuryl Esters | |
|---|---|---|
| | Acid No. | Sap. No. |
| 1. Dry crude $C_{19}$ dibasic acids (Acid No. 280, Sap. No. 290) | 2.3 | 206.8, 206.7 |
| 2. Residual after stripping monobasic acids from crude dibasic acids. (Acid No. 265, Sap. No. 320) | 2.8, 2.9 | 214.3 |
| 3. Distilled oxo $C_{19}$ dibasic acids (Acid No. 303, Sap. No. 320) | 2.3, 2.4 | 213, 213.2 |

The diethyl ester of heptadecanedicarboxylic acid was also prepared in the same manner as previously described in Example I.

The various resulting esters were then milled with a polyvinyl chloride resin. In general two parts of the polyvinyl chloride resin were milled with one part of the ester using a rubber mill operated at 60 p.s.i. steam pressure.

The esters of heptadecanedicarboxylic acid plasticized the polyvinyl chloride resins.

Having thus described our invention, we therefore claim:

1. A composition of matter comprising polyvinyl chloride plasticized with a diester having the structural formula:

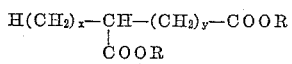

where $x$ is from 1 to 15, $y$ is from 1 to 15, the sum of $x$ and $y$ is 16 and R is a lower alkyl radical having 1 to 4 carbon atoms.

2. A composition of matter as defined in claim 1 in which 2 parts of polyvinyl chloride are plasticized with 1 part of said ester.

References Cited in the file of this patent

UNITED STATES PATENTS 2,650,908    Beears  ---------------- Sept. 1, 1953

OTHER REFERENCES

Matsuda et al.: "Chemical Abstracts," volume 50, Number 6, March 25, 1956, page 4032.

UNITED STATES PATENT OFFICE
CERTIFICATION OF CORRECTION

Patent No. 3,016,359                 January 9, 1962

Donald H. Wheeler et al.

It is hereby certified that error appears in the above numbered patent requiring correction and that the said Letters Patent should read as corrected below.

Column 1, lines 51 and 52, for $$-\overset{H}{\underset{.}{C}}-  \quad \text{read} \quad -\overset{H}{C}=\overset{H}{C}-$$

Signed and sealed this 8th day of May 1962.

(SEAL)
Attest:

ERNEST W. SWIDER               DAVID L. LADD
Attesting Officer               Commissioner of Patents